No. 622,306.　　　　　　　　　　　　　　　　　　　Patented Apr. 4, 1899.
A. R. WILSON & W. HOLT.
ACETYLENE BICYCLE LAMP.
(Application filed May 12, 1897.)
(No Model.)　　　　　　　　　　　　　　　　　　　　　　2 Sheets—Sheet 1.
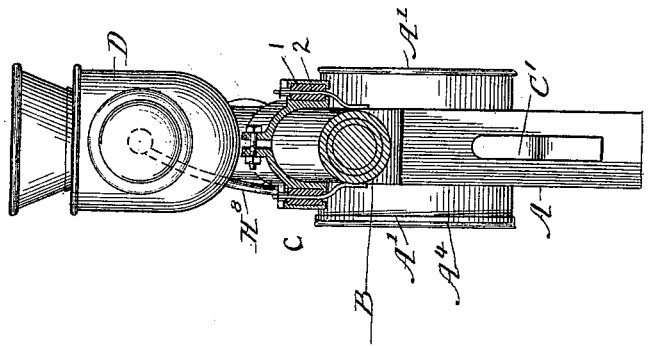
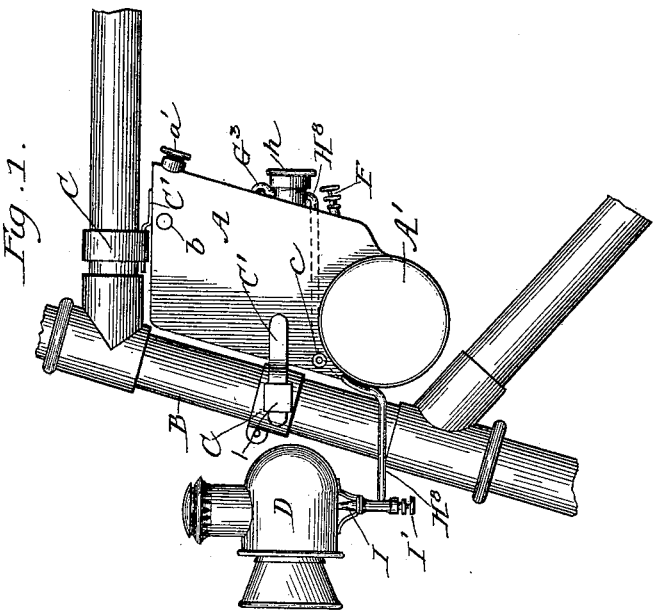
Witnesses:　　　　　　　　　　　　　　　　　　　Inventors:
　　　　　　　　　　　　　　　　　　　　　　　Archiabld R. Wilson
　　　　　　　　　　　　　　　　　　　　　　　William Holt
THE NORRIS PETERS CO., PHOTO-LITHO., WASHINGTON, D. C.

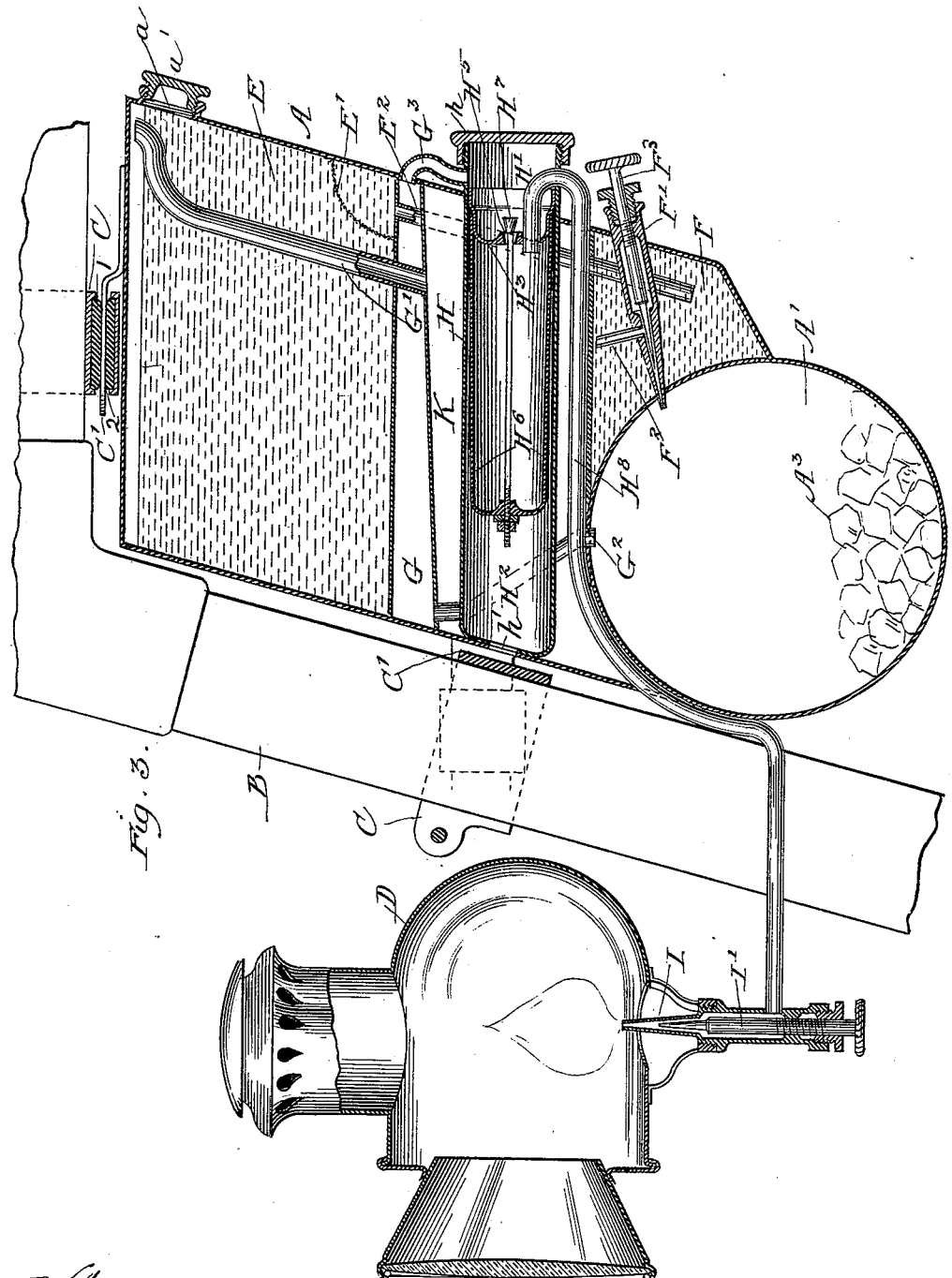

UNITED STATES PATENT OFFICE.

ARCHIBALD R. WILSON AND WILLIAM HOLT, OF CHICAGO, ILLINOIS.

ACETYLENE BICYCLE-LAMP.

SPECIFICATION forming part of Letters Patent No. 622,306, dated April 4, 1899.

Application filed May 12, 1897. Serial No. 636,266. (No model.)

*To all whom it may concern:*

Be it known that we, ARCHIBALD R. WILSON and WILLIAM HOLT, citizens of the United States, residing in the city of Chicago, county of Cook, and State of Illinois, have invented an Improvement in Bicycle-Lamps, of which the following is a specification.

Our invention relates to a novel construction in a bicycle or vehicle lamp adapted to generate and burn acetylene gas, the object being to provide a lamp of this character in which the gas cannot generate faster than it is consumed and which therefore will not be liable to explode; and it consists in the features of construction and combinations of parts hereinafter fully described and claimed.

In the accompanying drawings, illustrating our invention, Figure 1 is a partial side elevation of a lamp constructed in accordance with our invention, showing the manner of mounting same upon the frame of a bicycle. Fig. 2 is a top plan view of the same, the horizontal bar of the bicycle-frame being omitted. Fig. 3 is a longitudinal section of the lamp, the adjacent portions of the frame being shown in elevation.

Referring now to said drawings, A indicates the generating-chamber of the lamp as a whole, B the frame of the bicycle, and C the case-clamps for securing the lamp A to the frame. Said case-clamps C are provided with lugs 1, having openings 2 therein to receive lips or projections C' on the generating-chamber A of the lamp.

D indicates the lamp proper, which is connected with the generating-chamber by means of a pipe $H^8$, which also supports the same. The generating-chamber A of said lamp comprises a calcium-carbid chamber A', which is closed at one end by means of a screw-cap $A^4$, a water-chamber F, adjacent said chamber A', a governor and storage chamber K above said chambers A' and F, a storage-chamber G above said governor-chamber K, and a water-chamber E above said storage-chamber G. A valve F', operated by the valve-stem $F^3$, is interposed between said chambers A' and F, and communication between said chambers is established therethrough and through an upwardly-extending pipe $F^2$ on said valve, through which water is adapted to flow by gravity into the carbid-chamber A' and upon the calcium carbid $A^3$ therein. As soon as water enters said chamber A' gas is generated, which passes upwardly through the pipe $G^2$ into the storage-chamber G, thence through pipe $G^3$ into chamber H' of the governor H, which will be hereinafter fully described, and thence through pipe $H^8$ to lamp D. When said storage-chamber G and governor H are filled and the gas continues to be generated faster than it is consumed in the lamp, a pressure will be created and the surplus gas will force the water back through valve F' into the chamber F, where the gas will follow, filling the upper portion of chamber F and forcing the water therein through pipe $E^2$ into chamber E. If sufficient gas has been generated, it will be obvious that the water in chamber F will be forced to a level below the lower end of the pipe $E^2$, through which gas will then ascend into the upper end of chamber E and through pipe G' into chamber K, from which there is no outlet except through said pipe G'. In this manner we obtain a gas-pressure upon the water in chamber E which will be communicated to water in chamber F through the medium of the pipe $E^2$, and when said pressure exceeds the gas-pressure in chamber A' the water will be forced into said chamber, thus again generating gas, which will immediately force the water back, as before, thus preventing superfluous generation. In this manner, as will be obvious, we obtain an excellent pressure regulation, as the gas which once finds its way into chambers E and K cannot escape and exerts a constant pressure upon the water, which will insure the passage of that liquid into the chamber A' whenever the pressure therein becomes less than the pressure in said chamber E. Should the pressure in said chamber E become greater than is desired, it may be relieved through the vent b. (Shown in Fig. 1.) Said chamber E is fed through an opening a, which is closed by means of a screw-cap a'. The governor H consists of a cylindrical chamber closed by means of a screw-cap h at one end and at its other end provided with an opening h' to establish communication with the outer air. Said cylindrical chamber is divided into two compartments H' and $H^2$ by means of the cap or partition $H^3$. A tubular rubber diaphragm $H^6$ is secured to said cap $H^3$ at one end (said cap forming the head thereof) and is closed at its other end, said end being connected with the valve-stem of a valve $H^7$, which controls an opening $H^5$ in the cap $H^3$, through which gas passes from the chamber $H'$ into said diaphragm $H^6$. It will be obvious that when gas under pressure enters said diaphragm $H^6$ the latter will expand, thus operating said valve-stem to close said valve $H^7$ and shutting off the gas-supply. The said gas which enters said diaphragm $H^6$ passes through the pipe $H^8$ to the lamp D, where it is consumed. As soon as the gas-pressure in said diaphragm is relieved the latter will contract, thus again opening said valve $H^7$ and admitting more gas, which in this manner is fed to the lamp at a uniform pressure, thus giving a steady light. We provide a vent $c$ in said chamber K, through which any water which may find its way into said chamber can be drawn off.

We prefer to employ pin-valves in connection with our lamp, for the reason that the same are self-cleaning and are susceptible of better regulation. To this end we employ a needle-valve burner I, which is operated by the valve-stem $I'$.

We claim as our invention—

In an acetylene-lamp, a carbid-chamber, a water-chamber adjacent the same, connection between said carbid-chamber and the upper end of said water-chamber, connection between the lower end of said water-chamber and the lower end of an upper water-chamber, connection between said carbid-chamber and a gas-chamber below said upper water-chamber, connection between said gas-chamber and the upper end of said water-chamber, connection between said gas-chamber and a pressure-regulator chamber, and connection between said pressure-regulator chamber and a lamp, said pressure-regulator being interposed in said last-named connection.

ARCHIBALD R. WILSON.
WILLIAM HOLT.

Witnesses:
HARRY R. L. WHITE,
RAY A. WHITE.